United States Patent Office 3,491,408
Patented Jan. 27, 1970

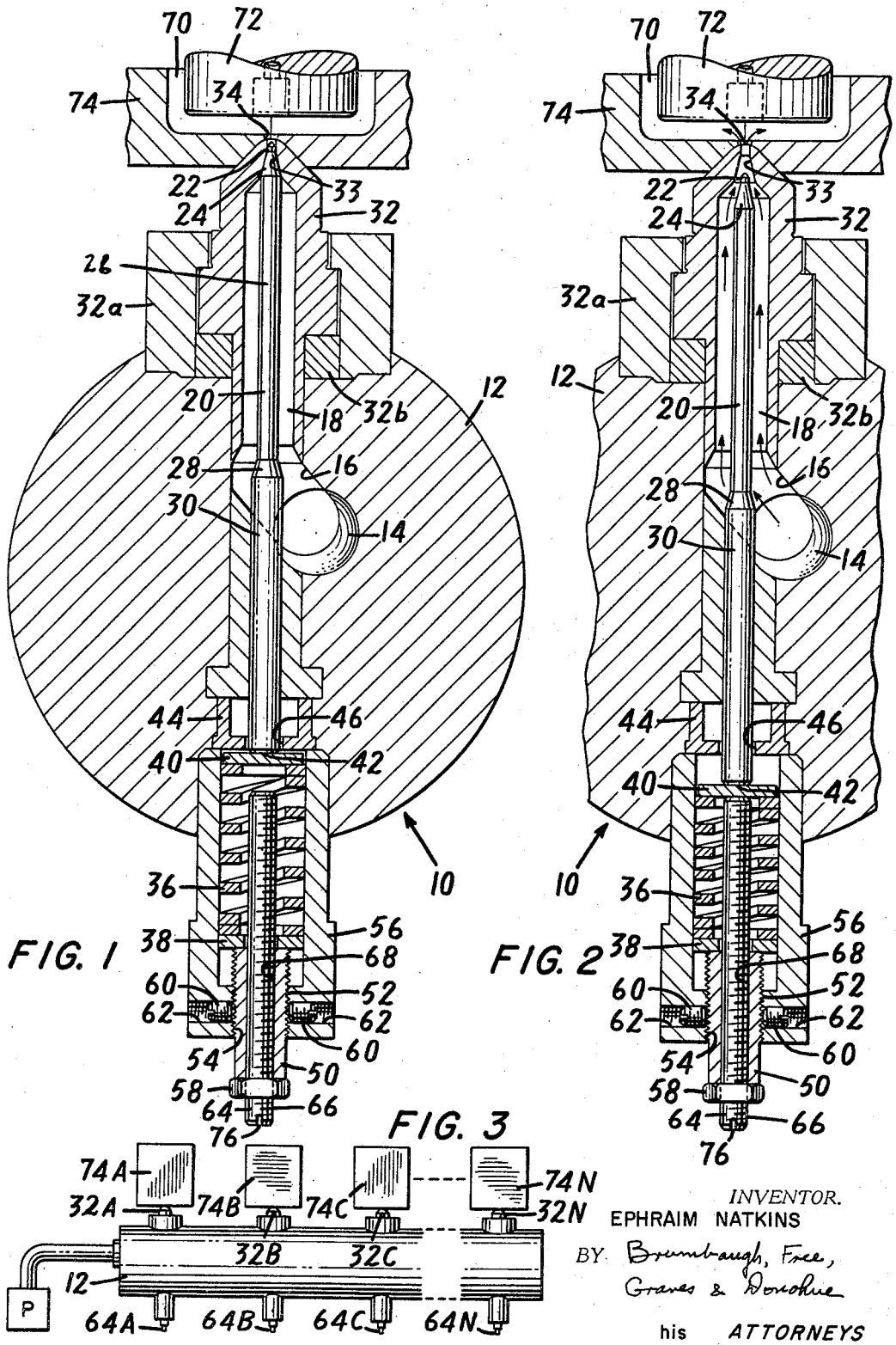

3,491,408
VALVE ADJUSTER AND STOP MECHANISM FOR AN INJECTION MOLDING MACHINE
Ephraim Natkins, Jackson Heights, N.Y., assignor to APL Corporation, Brooklyn, N.Y., a corporation of New York
Filed Oct. 13, 1967, Ser. No. 675,155
Int. Cl. B29f 1/03
U.S. Cl. 18—30     3 Claims

ABSTRACT OF THE DISCLOSURE

Individually-adjustable stops limit positively the maximum openings of a number of valves for discharging a mold substance into a corresponding number of mold cavities. The valves are opened by the pressure of the mold substance and closed by springs. Adjustment of the stops assures that the flow rates of mold substance through the valves when the valves are fully open are properly proportioned.

BACKGROUND OF THE INVENTION

This invention relates to a molding, and, more particularly, to novel and highly-effective injection molding apparatus permitting precise proportioning of the flow rates of mold substance through a number of mold valves into a corresponding number of mold cavities.

Conventional injection molding apparatus is characterized by imprecise control over the ratio of the flow rate of mold substance through one valve into an associated mold cavity to the flow rates through other valves of the apparatus into the mold cavities respectively associated therewith. For reasons of economy and efficiency of manufacture, it is desirable to employ a large number of mold-injection valve-controlled nozzles in a single injection-molding apparatus. In order to produce uniform molded articles, it is necessary that the flow rates of mold substance through the several nozzles be uniform or, more broadly, conform to a predetermined standard.

In conventional apparatus, the maximum openings of the several valves respectively controlling flow of mold substance through the mold nozzles are determined by the adjustment of springs which bias movable valve members respectively associated with the valves toward positions closing the valves. This conventional expedient is unsatisfactory, because springs vary somewhat and also conditions vary. In practice, it is not possible employing conventional apparatus to achieve cycle after cycle precise control of the flow rates of mold substance through the injection nozzles notwithstanding changing conditions of operation.

SUMMARY OF THE INVENTION

An object of the present invention is to remedy the shortcomings of conventional apparatus noted above. In particular, an object of the invention is to provide extremely reliable means for proportioning the flow rates of mold substance through a number of valves in accordance with a predetermined standard.

These and other objects of the invention are attained, in a representative embodiment of injection molding apparatus made in accordance with the invention by the provision of a plurality of valve means for discharging a mold substance into a plurality of mold cavities, each of the valve means including a movable valve member, and means for moving the valve members between valve-closing positions blocking flow of the mold substance through the valve means into the mold cavities and valve-opening positions permitting flow of the mold substance through the valve means into the mold cavities under pressure. In accordance with the invention, there is further provided a plurality of stop means respectively engageable with the valve members for positively limiting the movement of the valve members towards the valve-opening positions in order to limit the maximum opening of the valve means. Each stop means is individually adjustable so that the flow rates of the mold substance through the valve means when the valve members are in the valve-opening positions are proportioned in accordance with a predetermined standard.

BRIEF DESCRIPTION OF THE DRAWING

An understanding of additional aspects of the invention may be gained from a consideration of the following detailed description of a representative embodiment thereof, in conjunction with the accompanying figures of the drawing, in which:

FIG. 1 is a partly-sectional view of a representative embodiment of apparatus constructed in accordance with the invention in a "closed" condition;

FIG. 2 is a view corresponding to FIG. 1 showing the apparatus in an "open" condition; and FIG. 3 is a diagrammatic representation of apparatus constructed in accordance with the invention including a plurality of structures as shown in FIGS. 1 and 2.

DESCRIPTION OF THE PREFERRED EMBODIMENT

FIG. 1 shows a representative embodiment of apparatus 10 constructed in accordance with the invention. The apparatus 10 includes a distribution manifold 12 formed with a distribution channel 14. The axes of the manifold 12 and channel 14 are parallel to each other and normal to the plane of the figure. A number of inlet passages connect the channel 14 to a corresponding number of valve passages. In FIG. 1, a representative inlet passage 16 connecting the channel 14 and a valve passage 18 is shown.

Flow of mold substance through the valve passage 18 under pressure is controlled by a valve member 20 having a valve tip 22, a first frusto-conical portion 24, a first shank portion 26 of relatively small diameter, a second frusto-conical portion 28, and a second shank portion 30 of relatively large diameter.

The valve tip 22 and first frusto-conical portion 24 of the valve member 20 fit snugly within a nozzle tip 32 formed with a complemental bore when the apparatus 10 is in a "closed" condition. The nozzle tip 32 is properly positioned with respect to the manifold 12 by the combination of a retainer 32a and a spacer 32b. In the closed condition, mold substance cannot pass through the injection gate 34.

The valve member 20 is biased to the closed position by a compression coil spring 36 abutting a washer 38 at its rearward end and a plate 40 at its forward end. The length of the valve member 20 is such that, when the valve tip 22 and the first frusto-conical portion 24 are firmly seated in the bore 33 of the nozzle tip 32, a frusto-conical portion 42 formed on the rearward end of the valve member 20 projects slightly to the rear of a spacer 44 formed with an aperture 46 through which the second shank portion 30 of the valve member 20 projects. The compression coil spring 36 is thus adapted to urge the valve member 20 firmly toward the closed position.

The force with which the compression coil spring 36 urges the valve member 20 towards a closed condition is a function of the stiffness of the spring and of the adjustment of a screw sleeve 50 formed with an external helical thread 52 complemental to an internal helical thread 54 formed on a retainer 56 securely attached by any suitable means to the manifold 12.

The screw sleeve 50 is provided at its rearward end with a hexagonal nut 58 by means of which it is adapted to be rotated about its longitudinal axis to adjust the position of the washer 38 which it abuts and hence the position of the rearward end of the compression coil spring 36. When properly adjusted, the screw sleeve 50 can be secured against inadvertent displacement by tightening a plurality of set screws 60 mounted in bores 62 formed in the retainer 56.

The structure described thus far positively positions the valve member 20 in its forward or closed position. In accordance with the present invention, means is also provided for positively positioning the valve member 20 in its rearward or open position.

A pin 64 provided with an external helical thread 66 complemental to an internal thread formed in a bore 68 of the screw sleeve 50 positively limits movement of the valve member 20 towards the valve-opening position.

FIG. 2 shows the apparatus 10 in an open position in which the valve tip 22 and first frusto-conical portion 24 of the valve member 20 are spaced apart from the complemental bore 33 formed in the nozzle tip 32. This provides for flow of mold substance as shown by the arrows into a mold cavity 70 formed between a mold core 72 and an outer mold section 74.

The flow rate of mold substance into the mold cavity 70 when the valve member 20 is in its valve-opening position is a function of the extent of rearward movement of the valve member 20. In accordance with the invention, the rearward movement of the valve member 20 is precisely determined by the adjustment of the pin 64. The pin 64 is provided with suitable means such as a slot 76 permitting rotation of the pin about its longitudinal axis to adjust the position of the pin in directions along its axis and thereby precisely control the impedance to the flow of mold substance in the vicinity of the bore 33. The valve member 20 may be moved towards its valve-opening position by any suitable means and in the embodiment illustrated is moved by the pressure of the mold substance on the frusto-conical portion 28 initially and, as the valve member 20 begins to move towards its valve-opening position, by the pressure of the mold substance on the frusto-conical portion 24 as well. Superatmospheric pressures of the mold substance tend to move the valve member 20 towards its valve-opening position because the second shank portion 30 of the valve member 20 is not exposed at its rearward end to the pressure of the mold substance. The differential diameters of the various portions of the valve member 20 thus give rise, when the valve member 20 is subjected to superatmospheric pressures, to a force on the valve member 20 opposing the force exerted by the compression coil spring 36.

The valve member 20 is generally rod-shaped, and the pin 64 is also generally rod-shaped, and the valve member 20 and the pin 64 are aligned in end-to-end relation on a common axis. This arrangement makes the adjustment of the maximum opening of the valve member 20 extremely simple, precise, and trouble-free.

FIG. 3 illustrates diagrammatically the cooperation of a plurality of nozzle tips 32A, 32B, 32C . . . 32N with a corresponding number of molds 74A, 74B, 74C . . . 74N. Flow of mold substance through each of the nozzle tips 32A, 32B, 32C . . . 32N is governed by an associated valve member which when fully opened is in a position determined by the adjustment of a corresponding pin 64A, 64B, 64C . . . 64N. The flow rates of the mold substance through the respective valve means when the valve members are in the valve-opening positions are precisely proportioned in accordance with a predetermined standard by the simple operation of adjusting the pins 64A, 64B, 64C . . . 64N.

Thus there is provided in accordance with the invention novel and highly-effective apparatus facilitating the economical production of large numbers of injection-molded or injection-blow-molded products of substantially identical characteristics. In accordance with the invention, a major cause for the rejection of substandard articles is eliminated, and the speed and efficiency of the production process is significantly increased.

Many modifications of the representative embodiment of the invention disclosed herein will occur to those skilled in the art. For example, means other than the pressure means P shown diagrammatically in FIG. 3 can be employed to increase the pressure of the mold substance in the valve passage 18. Again, the valve member 20 need not be of differential diameters, and supplemental means for positively moving the valve member 20 to the valve-opening position may be provided. The invention is therefore to be construed as covering all of the embodiments thereof within the scope of the appended claims.

I claim:

1. Injection molding apparatus comprising a plurality of valve means for discharging a mold substance into a plurality of mold cavities, each of said valve means including a movable valve member, motive means including biasing means for moving said valve members between valve-closing positions blocking flow of said mold cavities and valve-opening positions permitting flow of said mold substance through said valve means into said mold cavities under pressure, said motive means including longitudinally-adjustable sleeve means for adjusting the force exerted by said biasing means, said biasing means continuously urging said valve members to said valve-closing positions, and a plurality of stop means mounted coaxially with said sleeve means and respectively engageable with said valve member for positively limiting the movement of said valve members towards said valve-opening positions in order to limit the maximum opening of said valve means, said stop means being individually longitudinally adjustable so that the flow rates of said mold substance through said valve means when said valve members are in said valve-opening positions are proportioned in accordance with the required flow rates into said mold cavities.

2. Injection molding apparatus as set forth in claim 1 in which said motive means for moving said valve members comprises means for controlling the pressure of said mold substance within said valve means, each valve member being of differential diameters and tending by virtue thereof to move toward said valve-opening position when subjected to superatmospheric pressures of said mold substance within said valve means.

3. Injection molding apparatus as set forth in claim 1 in which each of said valve members is generally rod-shaped and each of said stop means is generally rod-shaped and formed with a first helical thread, each of said valve members and its associated stop means being aligned in end-to-end relation on a common axis, said valve members and stop means abutting each other when said valve members are in said valve-opening positions, and further comprising a plurality of mounting means respectively associated with said stop means, each of said mounting means being formed with a second helical thread complemental to said first helical thread, said helical threads co-operating to permit precise adjustment of the positions of said stop means in directions along said axis by rotation of said stop means about said axis.

References Cited
UNITED STATES PATENTS

| | | | |
|---|---|---|---|
| 2,953,815 | 9/1960 | Mainardi | 18—30 |
| 3,252,184 | 5/1966 | Ninneman | 18—30 |
| 2,668,325 | 2/1954 | Goodwin | 18—30 |
| 3,023,458 | 3/1962 | Seymour | 18—30 |

FOREIGN PATENTS

| | | |
|---|---|---|
| 1,943,317 | 5/1959 | France. |
| 1,217,564 | 12/1959 | France. |
| 3,608,323 | 4/1959 | Japan. |
| 911,028 | 11/1962 | Great Britain. |

WILBUR L. McBAY, Primary Examiner